R. HURD.
Wagon Brake.
No. 112,252. Patented Feb. 28, 1871.
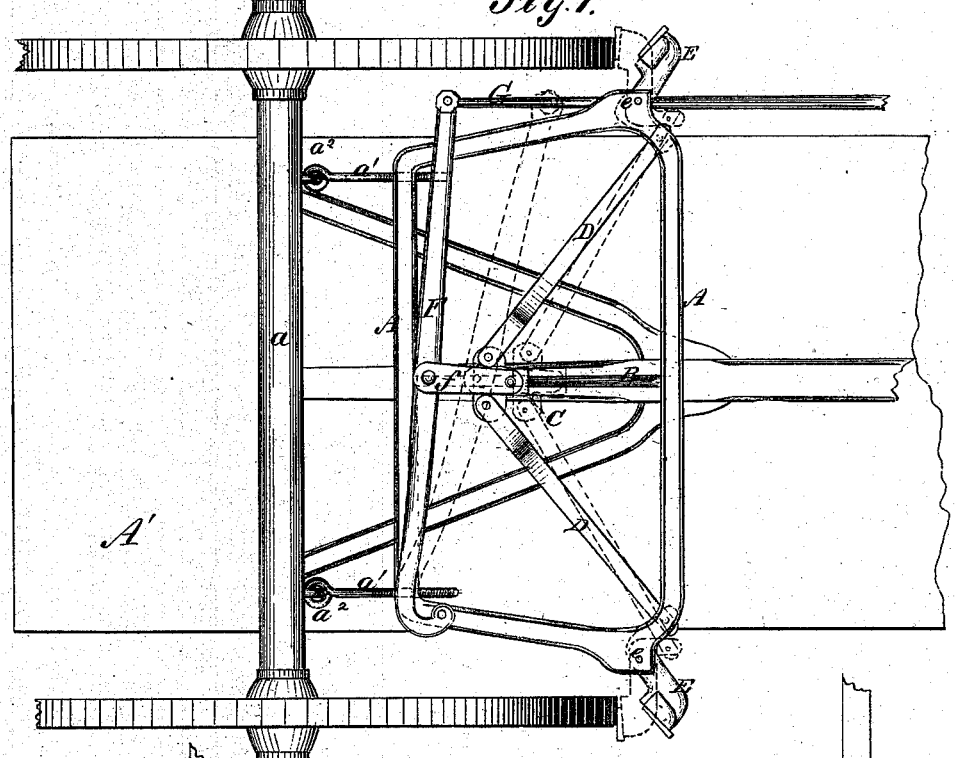
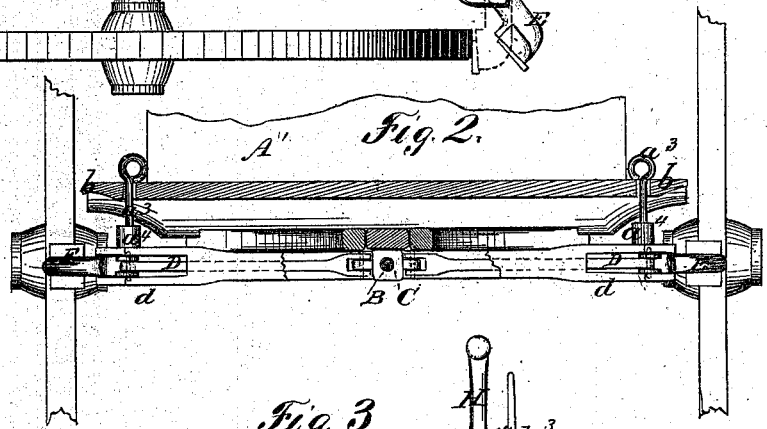
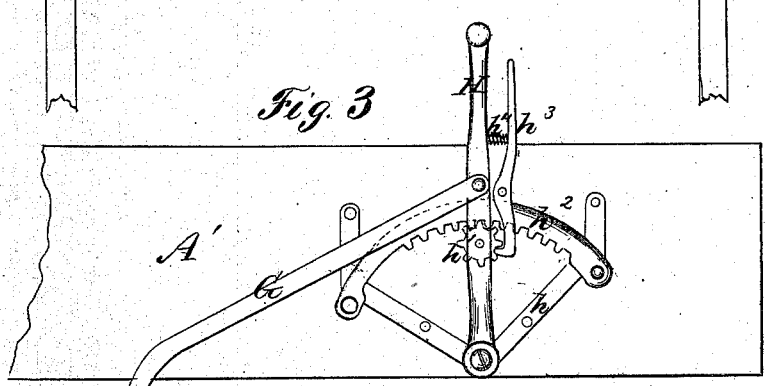

United States Patent Office.

REUBEN HURD, OF MORRISON, ILLINOIS.

Letters Patent No. 112,252, dated February 28, 1871.

IMPROVEMENT IN WAGON-BRAKES.

The Schedule referred to in these Letters Patent and making part of the same.

*To all whom it may concern:*

Be it known that I, REUBEN HURD, of Morrison, in the county of Whitesides and State of Illinois, have invented a certain new and useful Improvement in Wagon-Brakes; and I do hereby declare the following to be a full, clear, and exact description thereof, reference being had to the accompanying drawing forming a part of the same, and in which—

Figure 1 represents a plan view of my brake when applied to the bottom of a vehicle;

Figure 2, an end view of the same, with a portion thereof broken away and a portion in section; and Figure 3 is a side elevation of my improved brake-handle attached to the side of a vehicle, and provided with a rod for connecting it to the brake.

This invention relates to improvements in brakes for wagons, and consists in a novel construction and arrangement of the constituent parts thereof, and in the peculiar construction of the brake-handle, all of which will be definitely described and claimed hereafter.

Similar letters of reference in the several figures indicate corresponding parts of my invention.

To enable those skilled in the art to which my invention appertains to make and use the same, I will proceed to describe its construction and operation.

In the accompanying drawing—

A represents a frame, which is secured to the axle $a$ of a vehicle, by means of the screw-bolts $a^1 a^1$, upon one end of which are formed eyes, and hooks $a^2 a^2$, fastened to said axle, and secured to the transverse bar or brace $b$ of the vehicle by means of the eye-screw bolts $a^3 a^3$, which enter female screws cut in hollow shoulders or elevators $a^4 a^4$ formed or cast on the said frame, and pass up through slots cut in the brace $b$.

In the center of the frame A is secured rigidly a cylindrical bar or rod, B, upon which fits and slides a sleeve or collar, C, supplied with perforated arms or plates $c\ c$.

D D represent two bars or arms, which embrace and are pivoted at their inner ends to the plates $c\ c$ of sleeve C, and at their outer ends are pivoted to one end of the brakes or stops E E, after having passed through the slots $d\ d$ of frame A.

The brakes or stops E E are pivoted, at $e\ e$, in the frame A, and are constructed as shown in fig. 1.

F designates a lever, which is pivoted, at its curvilinear end, to the frame A, and connected at its center by means of a short plate or bar, $f$, to the sleeve C, the opposite end of said lever being connected to the rod G of the handle H.

H is a handle or lever, pivoted, at its lower end, at the vortex of the triangular frame $h$, which is secured by suitable means to the side of the vehicle A'.

Located within an aperture cut in the lever H is a pinion or cog-wheel, $h^1$, which engages with a toothed segmental bar, $h^2$, secured to the frame $h$, as shown, and passing through the aperture of lever H.

$h^3$ is a pawl, which is pivoted to the lever H, with its lower end or tooth entering the pinion $h^1$, and supplied at its upper portion with a spiral spring, $h^4$, for forcing its said tooth into the serrations formed by the teeth of the pinion $h^1$.

It will be observed that, by so constructing my brake-handle, as above described, it can be readily and quickly held at any desired point in applying the brake to or relieving it from the wheels of the vehicle.

Having thus described my invention,

What I claim, and desire to secure by Letters Patent, is—

1. The frame A, in combination with the eye-screw bolts $a^3 a^3$ and screw-bolts $a^1 a^1$, substantially as shown and described.

2. The brakes or stops E E, constructed as shown, in combination with the frame A, rod B, sleeve C, movable connecting-bars D D, link $f$, lever F, and rod G, substantially as set forth.

3. The combination of the brake-handle H, pinion $h^1$, pawl $h^3$, spring $h^4$, and segmental bar $h^2$, substantially as shown and described.

In testimony that I claim the foregoing as my invention I have signed my name hereunto this   day of January, 1871, in the presence of two subscribing witnesses.

REUBEN HURD.

Witnesses:
L. G. JOHNSON,
WARREN WILDER.